United States Patent
Weinberger et al.

[11] Patent Number: 6,053,287
[45] Date of Patent: *Apr. 25, 2000

[54] LINEAR DRIVE FOR TRANSPORTATION EQUIPMENT

[75] Inventors: Karl Weinberger, Cham; Gert Silberhorn, Küssnacht; Jean Marie Rennetaud, Dierikon, all of Switzerland

[73] Assignee: Invento AG, Hergiswil NW., Switzerland

[*] Notice: This patent issued on a continued prosecution application filed under 37 CFR 1.53(d), and is subject to the twenty year patent term provisions of 35 U.S.C. 154(a)(2).

[21] Appl. No.: 09/065,745

[22] Filed: Apr. 24, 1998

[30] Foreign Application Priority Data

Apr. 25, 1997 [EP] European Pat. Off. .............. 97810261

[51] Int. Cl.⁷ ...................................... B66B 5/12
[52] U.S. Cl. ......................... 187/370; 187/367; 187/351; 188/171; 188/41; 188/43
[58] Field of Search ................... 187/289, 277, 187/367, 370, 315, 316, 250, 351, 369; 310/328; 188/38, 171, 138, 42–44, 41

[56] References Cited

U.S. PATENT DOCUMENTS

| | | | |
|---|---|---|---|
| 3,684,904 | 8/1972 | Galutva et al. | 310/328 |
| 4,623,044 | 11/1986 | Ohta et al. | 188/72.1 |
| 4,854,424 | 8/1989 | Yamatoh et al. | 188/72.1 |
| 4,947,077 | 8/1990 | Murata | 310/328 |
| 5,027,027 | 6/1991 | Orbach et al. | 310/328 X |
| 5,090,518 | 2/1992 | Schenk et al. | 288/72.1 |
| 5,213,172 | 5/1993 | Paris | 180/9.1 |
| 5,319,257 | 6/1994 | McIntyre | 310/328 |
| 5,332,942 | 7/1994 | Rennex | 310/328 |
| 5,668,355 | 9/1997 | Jaminet et al. | 187/315 X |
| 5,780,957 | 7/1998 | Oliver et al. | 310/328 |

FOREIGN PATENT DOCUMENTS

| | | |
|---|---|---|
| 0 352 858 | 1/1990 | European Pat. Off. . |
| 06294423 | 10/1994 | Japan . |
| 000307052 | 6/1971 | U.S.S.R. ................. 187/250 |

*Primary Examiner*—Douglas Hess
*Assistant Examiner*—Steven B. McAllister
*Attorney, Agent, or Firm*—MacMillan, Sobanski & Todd, LLC

[57] ABSTRACT

An apparatus for moving a car along a travel path along guide rails includes a linear drive having a fixed first platform attached to the car and connected by springs with a movable second platform. Holding-units are attached to both platforms for engaging the guide rails and operating-units are connected between the platforms for relative movement. The holding-units and the operating-units include piezoelectric actuators that are selectively energized to move the car.

4 Claims, 4 Drawing Sheets

Fig. 6.1
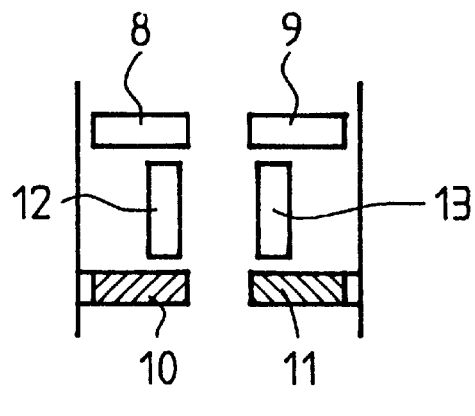
Fig. 6.2
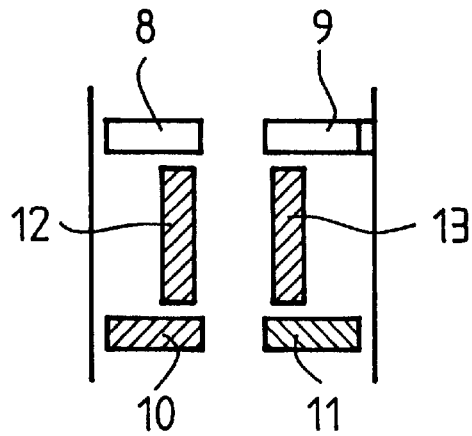
Fig. 6.3
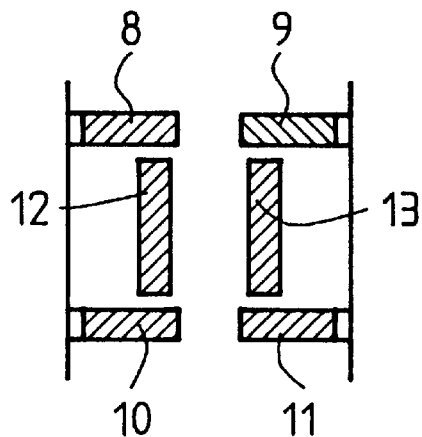
Fig. 6.4
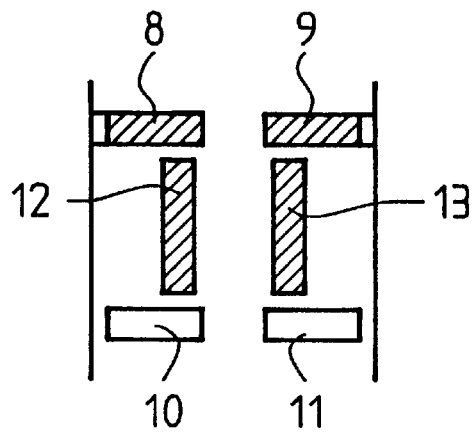
Fig. 6.5
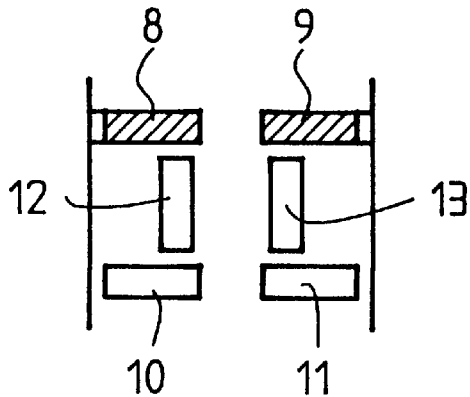
Fig. 6.6
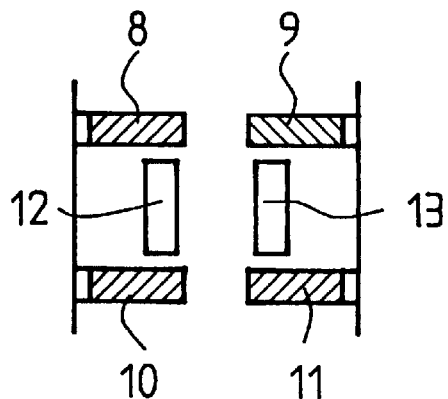

Fig. 7.1
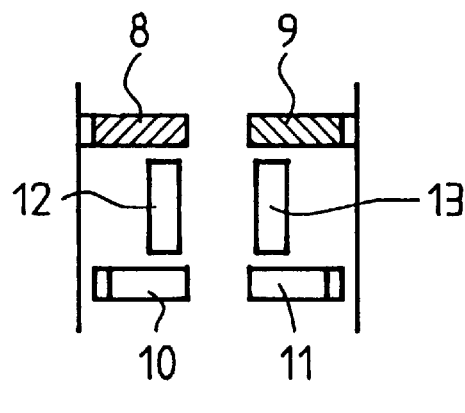
Fig. 7.2
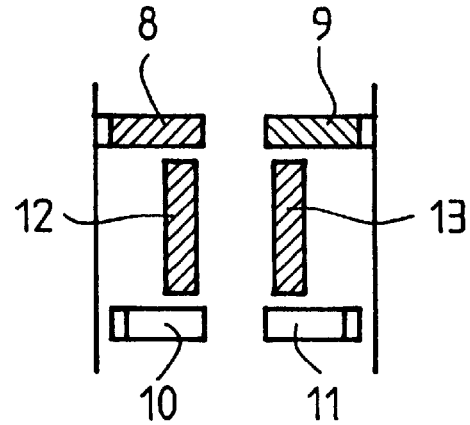
Fig. 7.3
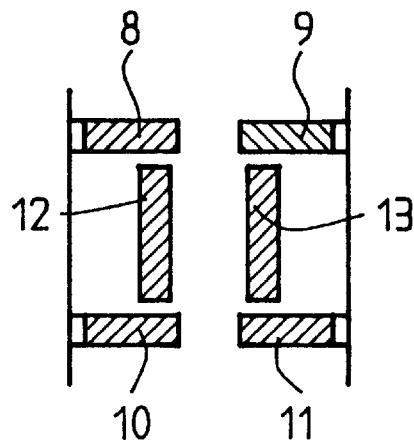
Fig. 7.4
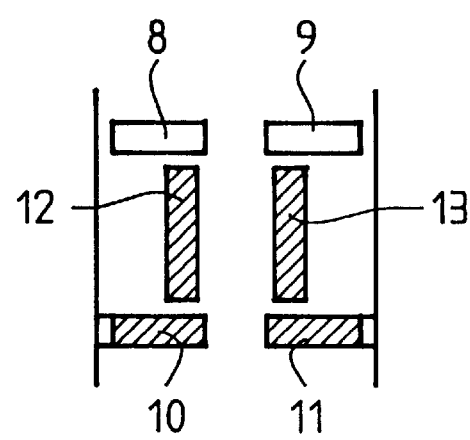
Fig. 7.5
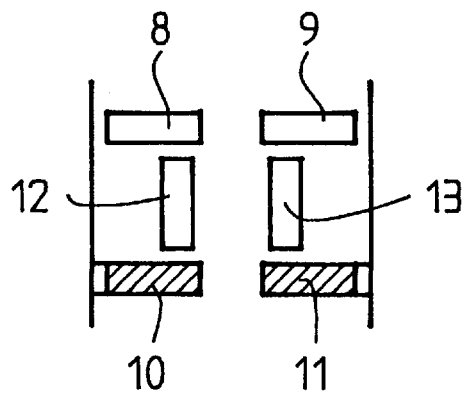
Fig. 7.6
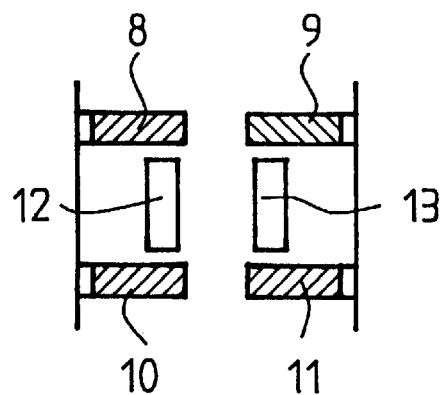

LINEAR DRIVE FOR TRANSPORTATION EQUIPMENT

BACKGROUND OF THE INVENTION

The present invention relates generally to a linear drive for a transportation system and, especially, involves a linear drive for an elevator installation.

The elevator car, the counterbalance weight and the doors in an elevator system typically are driven by rotary electric motors. The elevator car and the counterbalance weight are attached to opposite ends of a cable extending over a pulley or sheave driven in rotation by a rotary motor. The elevator doors are attached to belts extending around friction disks driven in rotation by a rotary motor. Linear drives are also used for driving elevator doors. With linear drives or with friction drives, the motor is driving the cable that connects the elevator car and the counterbalance over a return pulley. With the friction wheel drive principle or the linear magnet principle, the cable is connected at the elevator car. All drive types also require independent safety devices in case the drive fails and the elevator car begins to drop. The safety device must brake the elevator car from a certain overspeed and smoothly bring the car to a stop.

A disadvantage of the known equipment is that a complex mechanical system is necessary for the drive and for the safety device with many individual parts. As a consequence of the mechanical complexity, such equipment is expensive to manufacture and maintain, as well as is more likely to break down disturbing the service.

SUMMARY OF THE INVENTION

The present invention concerns a remedy to avoid the disadvantages of the known equipment and to manage transportation equipment that functions as a brake and/or a safety device.

The advantages reached through the invention are that a linear drive includes the brake and safety device functions with a few simple mechanical parts. Furthermore, energy savings are possible over conventional drives. Further advantageous is, that the electromagnetic fields generated by the conventional magnet motors are not generated and that the reaction time of the brake and safety device essentially can be shortened.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 6.1 through FIG. 6.6 are schematic representations of the operation of the linear drive moving the travelling car in an upward direction; and FIG. 7.1 through FIG. 7.6 are schematic representations of the operation of the linear drive moving the travelling car in a downward direction.

DESCRIPTION OF THE PREFERRED EMBODIMENT

Figure 1:
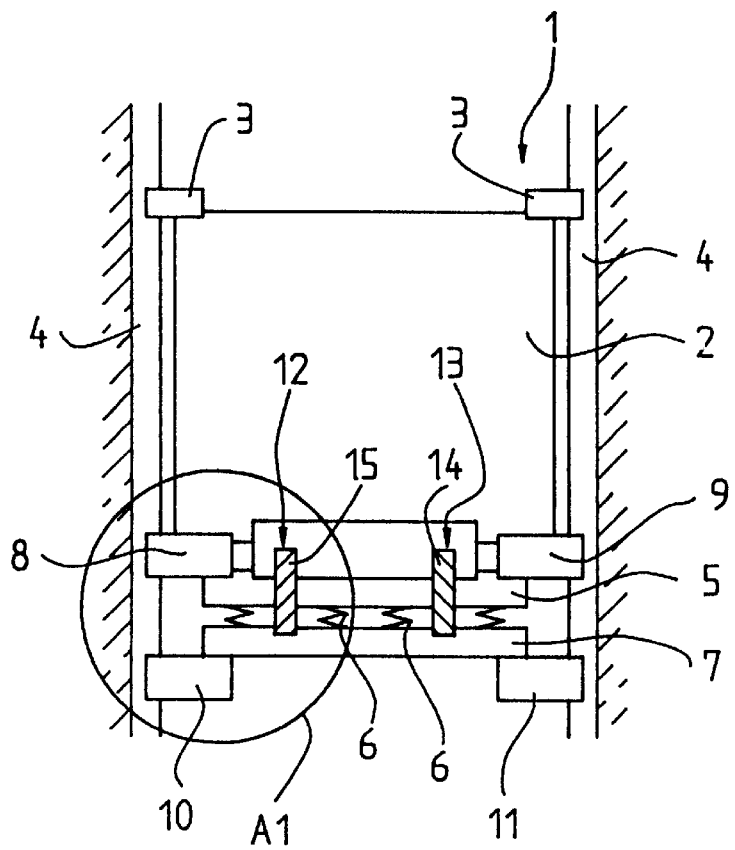
FIG. 1 is a schematic view of a travelling car equipped with a linear drive in accordance with the present invention.

In the FIG. 1 there is shown a generally vertical travel path 1, along which at least one car 2 is operating as transportation equipment for persons or objects. At an upper end of the car 2 a pair of guides 3 are attached for leading the car along a pair of guide rails 4 extending along opposite sides of the path 1. At a lower end of the car, there is attached a linear drive in accordance with the present invention. The guides 3 also can be below the car 2 and the linear drive can be attached above the car. Also, the guides 3 and the linear drive can be mounted together above and/or below the car 2. Fixedly attached to the car 2 at the lower end thereof is a first platform 5 connected by means of a plurality of springs 6 with a movable second platform 7 positioned below the first platform. Attached to the first platform 5 are a first holding-unit 8 and a second holding-unit 9. Attached to the second platform 7 are a third holding-unit 10 and a fourth holding-unit 11. The holding-units 8, 9, 10 and 11 each extend on opposite sides of an associated one of the rails 4 as shown in the FIG. 3. Details of the holding-units 8, 9, 10 and 11, particularly in that portion of the FIG. 1 designated as "A1", are shown in the FIGS. 2 through 5.

The example embodiment shown in the drawings depicts a vertical travel path 1, such as a track or an elevator shaft, along which the car 2 travels. However, the travel path 1 also can extend horizontally or at an incline.

With door drives for elevators, the transportation equipment consists of one "car" moving along a travel path, for example a sled for the transportation of the car doors or the floor doors, that is driven and braked by the linear-drive according to the present invention.

A first operating-unit 12 and a second operating-unit 13 are connected at opposite ends with the fixed first platform 5 and the movable second platform 7. The weight of the second platform 7, the third holding-unit 10 and the fourth holding-unit 11 is compensated for by means of the springs 6, such that the operating-units 12 and 13 remain tension free. In the FIG. 1, the two operating-units 12 and 13 are shown, but only one or more than two could be used. The first operating-unit 12 and the second operating-unit 13 each include at least one piezoelectric actuator 14 and 15. The first and second piezoelectric actuators 14 and 15 can be formed, for example, from a stack of several dozen piezoelectric elements, like crystals or layers of ceramics or polyvinylfluoride, between two electrodes. When a voltage is applied at the electrodes, the piezoelectric elements experience an expansion deformation in the length. The expansion is enough for the movement of the car 2 or the doors. The manner of operation of the linear drive in an upward direction is shown in the FIGS. 6.1 through 6.6 and in a downward direction in the FIGS. 7.1 through 7.6. For example, five parallel column actuators can be used with seven in row for the movement of the car 2. Such an operating-unit generates a quintuple operating strength and a seven-fold longitudinal expansion as well as speed of the car 2 as a single actuator with same switch-frequency.

For drives requiring the generation of significant force, for example an elevator car drive, the piezoelectric elements become actuators below their own resonance frequency, driven for example with a 500 Hz signal.

Figure 2:
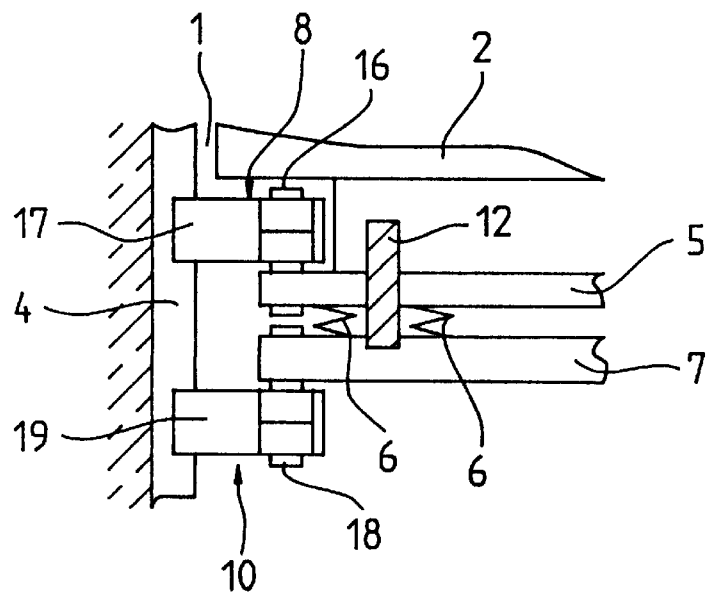
FIG. 2 is an enlarged view of a portion of the FIG. 1 showing a holding-unit of the linear drive.
Figure 3:
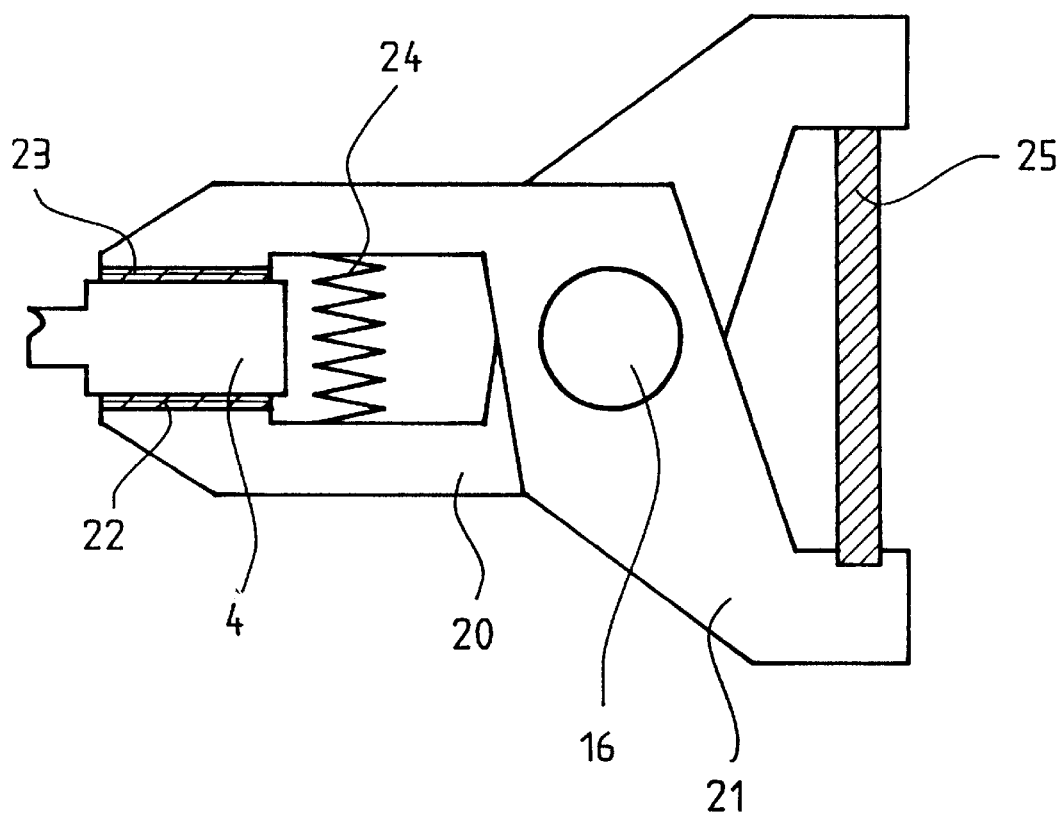
FIG. 3 is an enlarged view of the holding-unit shown in the FIG. 2.

The FIGS. 2 and 3 show the construction of the first and third holding-units 8 and 10. The second and fourth holding-unit 9 and 11 are identical in the construction and in the function. The first holding-unit 8 extends from one side of the first platform 5 and includes a first brake caliper 17 pivotally mounted on a first axle 16. The third holding-unit 10 extends from one side of the second platform 7 and includes a third brake caliper 19 pivotally mounted on a third axle 18. The remaining construction and the function of the third holding-unit 10 is identical with the first holding-unit 8. A first arm 20 and a second arm 21, of the first brake caliper 17 rotate about the first axle 16 and carry a first brake lining 22 and a second brake lining to 23, respectively, which brake linings can be rotated into engagement with opposite sides of the guide rail 4 to generate a braking force.

Opposite ends of a second spring 24 are connected to the arms 20 and 21 to draw the arms 20 and 21 toward one another and engage the brake linings 22 and 23 with the guide rail 4 providing a frictional holding connection between the guide rail and the first platform 5. The other ends of the arms 20 and 21 are connected by a third piezoelectric actuator 25. Excitation of the piezoelectric actuator 25 extends it. The force generated by the third actuator 25 overcomes the second spring 24 and moves the brake linings 22 and 23 out of engagement with the guide rail 4 consequently releasing the first platform 5 for movement relative along the guide rail.

For example, six actuators can be switched in parallel. Such a holding-unit generates sextuple the force of a holding-unit with a single actuator.

Figure 4:
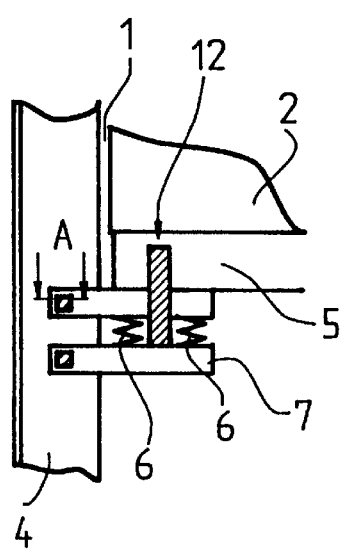
FIG. 4 is a schematic view of an alternate embodiment of the holding-unit.
Figure 5:
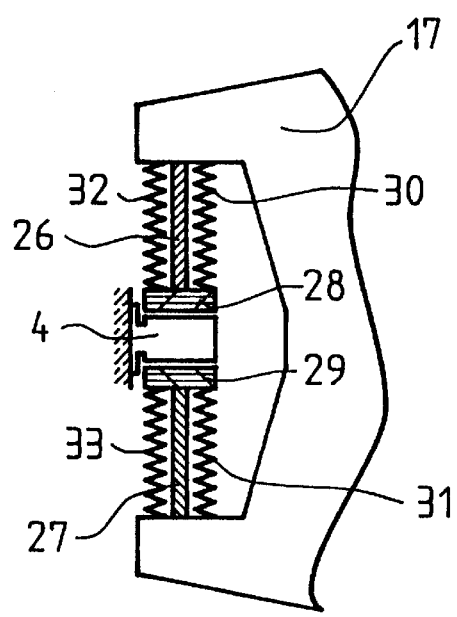
FIG. 5 is an enlarged view of a portion of the holding-unit shown in the FIG. 4.

There is shown in the FIG. 4 a variation or alternate embodiment of the holding-units 8, 9, 10 and 11 and the FIG. 5 shows a section along the line A—A of the FIG. 4. The holding-unit includes a fourth actuator 26 and a fifth actuator 27 that apply a braking force by engaging a third brake lining 28 and a fourth brake lining 29, respectively, against the guide rail 4. A third, fourth, fifth and sixth springs 30, 31, 32 and 33 are connected between the brake linings and the brake caliper 17 to hold the brake linings out of engagement with the guide rail 4 when the actuators 26 and 27 are not extended.

The holding-units 8, 9, 10 and 11 serves not only to drive the car 2 but also as safety devices. Under normal operation, the holding-units 8, 9, 10 and 11 are also used with a holding-brake for avoiding a dropping motion when loading the car 2. In emergencies, for example with overspeed of the car 2, the holding-units 8, 9, 10 and 11 are actuated as brakes as well as are catch-devices. The braking and safety functions show a redundancy of two, because two holding-units 8 and 9 are necessary to avoid overspeed and to smoothly stop the car 2, the remaining two holding-units 10 and 11 function as safety devices.

Sensors and a control oversee the operation of the holding-units 8, 9, 10 and 11 and the operating-units 12 and 13. For example, with the longitudinal expansion of the operating-units 12 and 13 and the holding-units units 8, 9, 10 and 11, the pressure on the guide rail 4 can be measured by the sensors. The sensor signals are processed by the control. In the FIGS. 6.1 through 6.6 and the FIGS. 7.1 through 7.6, the sequence of operation of the actuators is shown with the energized actuators cross-hatched, When the sensors detect the proper actuators energized, the control then generates the necessary signals to energize the actuators in accordance with the next working step. For example, in the FIG. 6.2, the actuators of the operating-units 12 and 13 are energized after the engagement pressure at the brake linings 22 and 23 or 28 and 29 is sensed and read by the control.

The FIGS. 6.1 through FIG. 6.6 show the operation of the linear drive to effect an upward direction of movement of the car 2. As shown in the FIG. 6.1, the third holding-unit 10 and the fourth holding-unit 11 are actuated to engage the guide rails 4 and support the car 2. The FIG. 6.2 shows the upward movement of the car 2 with energization of the actuators 14 and 15 of the operating-units 12 and 13. Through the longitudinal expansion of the piezoelectric actuators 14 and 15, the car 2 is pushed upwardly. In accordance with the FIG. 6.3, the car 2 is also supported by the actuation of the first holding-unit 8 and the second holding-unit 9. In the FIG. 6.4, the third holding-unit 10 and the fourth holding-unit 11 are disengaged from the guide rail 4. In the FIG. 6.5, the operating-units 12 and 13 are deactivated resulting in the second platform 7 being pulled up. The FIG. 6.6 shows all of the holding-units 8, 9, 10 and 11 actuated and engaging the guide rails 4.

The FIGS. 7.1 through FIG. 7.6 show the operation of the linear drive in a downward direction of travel. The linear drive works analogously to the upward direction in the downward direction.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for releasably holding an elevator car at a selected position on a generally vertical path of travel along a guide rail comprising:

an axle adapted to be attached to an elevator car;

a pair of arms each having a brake end and an actuator end, said arms being pivotally mounted on said axle intermediate said brake ends and said actuator ends, said arms crossing one another at said axle such that moving said arms apart at the actuator end causes said arms at the brake end to move apart;

each said brake end of said arms having an associated brake lining attached thereto;

a spring connected between said arms between said brake end and said pivotal mounting on said axle, said spring exerting a first force to rotate said arms about said axle moving said brake ends and said brake linings toward one another; and a piezoelectrically operated actuator connected between said arms between said actuator end and said pivotal mounting on said axle whereby when said actuator is electrically excited, said actuator exerts a second force to overcome said first force to rotate said arms about said axle moving said actuator ends and said brake linings away from one another.

2. The apparatus according to claim 1 wherein said piezoelectric actuator is electrically excited by being energized below its resonance frequency.

3. An apparatus for releasably holding an elevator car at a selected position on a generally vertical path of travel along a guide rail comprising:

a pair of axles adapted to be attached to opposite sides of an elevator car;

two pairs of arms, each arm having a brake end and an actuator end, an associated one of said pairs of arms being pivotally mounted on each of said axles intermediate said brake ends and said actuator ends, said arms of each said pair of arms crossing one another at said axle such that moving said arms apart at the actuator end causes said arms at the brake end to move apart;

each said brake end of said arms having an associated brake lining attached thereto;

a spring connected between said arms of each said pair of arms between said brake end and said pivotal mounting on each of said axles, said springs each exerting a first force to rotate said arms about said axles moving said brake ends and said brake linings toward one another; and a piezoelectrically operated actuator connected between said arms of each said pair of arms between said actuator end and said pivotal mounting on each of said axles whereby when said axles are attached to the elevator car, said brake linings engage guide rails along a path of travel of the elevator car to frictionally hold the elevator car at a selected position, and when said actuators are electrically excited, said actuators exert a second force to overcome said first force to rotate said arms about said axles moving said actuator ends and said brake linings away from one another to disengage said brake linings from the guide rails and release the elevator car for movement along the guide rails.

4. The apparatus according to claim 3 wherein said piezoelectric actuators are each electrically excited by being energized below its resonance frequency.

* * * * *